(12) United States Patent
Sherman et al.

(10) Patent No.: US 8,659,989 B2
(45) Date of Patent: Feb. 25, 2014

(54) METHOD AND APPARATUS FOR WAVEFORM INDEPENDENT RANGING

(75) Inventors: Matthew J. Sherman, Succasunna, NJ (US); Gary R. Lomp, Centerport, NY (US); Andrew M. Comba, Little Falls, NJ (US); David A. Haessig, Jr., Towaco, NJ (US); Joel D. Reiss, Bloomfield, NJ (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 301 days.

(21) Appl. No.: 13/022,078

(22) Filed: Feb. 7, 2011

(65) Prior Publication Data

US 2011/0194402 A1 Aug. 11, 2011

Related U.S. Application Data

(60) Provisional application No. 61/302,350, filed on Feb. 8, 2010.

(51) Int. Cl.
*H04J 11/00* (2006.01)
*H04L 12/26* (2006.01)

(52) U.S. Cl.
USPC .......................................... 370/210; 370/252

(58) Field of Classification Search
USPC ............. 370/203, 210; 455/403, 422.1, 456.1
See application file for complete search history.

(56) References Cited

U.S. PATENT DOCUMENTS

| | | | |
|---|---|---|---|
| 6,469,665 B2 * | 10/2002 | Porcino | 342/387 |
| 7,072,411 B1 | 7/2006 | Dollard | |
| 8,145,238 B2 * | 3/2012 | Anderson et al. | 455/456.1 |
| 2006/0132348 A1 * | 6/2006 | Valand | 342/13 |

* cited by examiner

*Primary Examiner* — Chi Pham
*Assistant Examiner* — Robert Lopata
(74) *Attorney, Agent, or Firm* — Sand & Sebolt; Rodney E. Haven; Daniel J. Long (57) ABSTRACT

A system and method for calculating a time of arrival (TOA) of an electromagnetic signal is presented. A method receives a fast Fourier transform (FFT) signal that is a FFT of an original electromagnetic signal containing symbol data. The FFT signal is either multiplied or divided with a value to remove the symbol data. Removing the symbol data generates a perturbed data values representing perturbed signal with a perturbed covariance. The method calculates a perturbed covariance of the perturbed data values. After the perturbed covariance is calculated, the method at least partially corrects the perturbed covariance to produce a corrected covariance. The TOA of the original electromagnetic signal is calculated based, at least in part, on the perturbed covariance.

12 Claims, 4 Drawing Sheets

METHOD AND APPARATUS FOR WAVEFORM INDEPENDENT RANGING

CROSS REFERENCE TO RELATED APPLICATION

This application claims priority from U.S. Provisional Application Ser. No. 61/302,350, filed Feb. 8, 2010; the disclosure of which is incorporated herein by reference.

BACKGROUND OF THE INVENTION

1. Field of Invention

The current invention relates generally to apparatus, systems and methods for radio communication. More particularly, the apparatus, systems and methods relate to extracting information from a received signal. Specifically, the apparatus, systems and methods provide for methods and systems for extracting time of arrival (TOA) information from a noisy signal.

2. Description of Related Art

It is desirable to be able to utilize existing radio communication signals, such as those employed in military environments, to perform range estimation. The use of standard communication signals, as opposed to special purpose ranging signals, allows existing radio systems to be outfitted with ranging algorithms, giving the advantage of ranging and navigational support without adding additional equipment to the platform. This permits deployment of the technology on existing platforms without adding size, weight or material costs, a significant value enhancement in crowded equipment bays or in man-carried mobile applications.

In radio communications, there is a delay in propagation between transmitter and receiver nodes in a network. This delay is directly proportional to the distance traveled by the radio wave, including reflections if any. In many scenarios there is a dominant direct path (line of sight) whose length is proportional to the straight line range between nodes. By identifying and measuring this path, particularly the TOA of the signal component it carries, a useful estimate of the range may be obtained.

The accurate estimation of TOA is complicated by several factors that are present in a communications scenario. First, the available signal is data-dependent (encoded with user information). In general, this obscures the waveform structure that is to be exploited in measuring TOA and so the data dependency must be stripped before range estimation is possible. Second, the operating environment generally includes multiple reflectors and scattering media resulting in a received signal that is characterized by multi-path. Third, range (TOA) accuracy depends on the bandwidth of the underlying signal which may be limited. This limitation is particularly important in the use of linear processing techniques since the available precision and resolution is nominally equal to the reciprocal of the signal bandwidth. Since it is desirable to estimate the leading edge of the signal multi-path bundle, it is imperative that the respective "rays" be resolvable. For this reason it becomes necessary to utilize non-linear techniques, such as subspace methods MUSIC, root-MUSIC, and ESPRIT.

A need, therefore, exists for an improved method for extracting TOA from a waveform.

SUMMARY OF THE INVENTION

The preferred embodiment of the invention includes a method for calculating a time of arrival (TOA) of an electromagnetic signal. The method receives a fast Fourier transform (FFT) signal that is an FFT of an original electromagnetic signal containing symbol data. The FFT signal is either multiplied or divided with a value to remove the symbol data. Removing the symbol data generates a perturbed signal that is comprised of perturbed data values with a perturbed covariance. The method calculates a perturbed covariance of the perturbed data values. After the perturbed covariance is calculated, the method at least partially corrects the perturbed covariance to produce a corrected covariance. The TOA of the original electromagnetic signal is calculated based, at least in part, on the corrected covariance.

In another configuration of the preferred embodiment, the method calculates a distance to a transmitting source of the original electromagnetic signal based, at least in part, on the corrected covariance. Once the distance is known, the method next locates the transmitting source based, at least in part, on the distance.

In some configurations of the preferred embodiment, the calculation of a covariance further comprises applying a smoothing function to the corrected data values to generate an approximation of the covariance. The at least partially correcting of the perturbed covariance further includes at least partially correcting the approximation of the covariance to produce a corrected approximation of the covariance. The calculation of the TOA of the original electromagnetic signal is based, at least in part, on the corrected approximation of the covariance.

In another configuration of the preferred embodiment, the method includes performing an inverse FFT (IFFT) on the perturbed data values to produce time domain data values. Calculating the TOA of the original electromagnetic signal is based, at least in part, on the time domain data values. This method can correct the perturbed covariance in the time domain.

Other configurations of the preferred embodiment can include determining whether the FFT signal needs to be multiplied by complex conjugate values to remove the symbol data and using complex conjugate values to remove the symbol data when the FFT signal needs to be multiplied by complex conjugate values to remove the symbol data. The method can at least partially correct the perturbed covariance with a first method when the FFT signal does not need to be multiplied by complex conjugate values to remove the symbol data. When the FFT signal needs to be multiplied by complex conjugate values to remove the symbol data, the method at least partially corrects the perturbed covariance with a second method that is different than the first method.

Other configurations of the preferred embodiment can include other useful actions and features. For example, the method can read reference signal data out of a memory and the calculating a covariance can be based, at least in part, on the reference signal data. In another configuration, at least a portion of the method is performed by at least one subspace method of the group of: estimation of signal parameters via rotational invariant techniques (ESPRIT), multiple signal classification (MUSIC) and root-MUSIC. The method can calculate the TOA, at least in part, by calculating peak values of the covariance and wherein the TOA is calculated based, at least in part, on the peak values. Portions of the method can be performed with software.

Another configuration of the preferred embodiment is a system for calculating the TOA of an electromagnetic signal. The system includes symbol removal logic, covariance logic, correction logic and TOA logic. The symbol removal logic receives a fast Fourier transform (FFT) signal that is a FFT of an original electromagnetic signal containing symbol data and removes the symbol data to generate a perturbed signal that is comprised of a perturbed data values with a perturbed covariance. The covariance logic calculates the perturbed covariance of the perturbed data values. The correction logic, at least partially, corrects the perturbed covariance to produce a corrected covariance. The TOA logic calculates the TOA of the original electromagnetic signal based, at least in part, on the corrected covariance and the perturbed data values.

In another configuration of the system, the symbol removal logic further includes multiplication logic configured to multiply the FFT signal with a value that will strip the symbol data from the FFT signal to produce the perturbed data values. The system may further include inverse FFT (IFFT) logic. The IFFT transforms the corrected data values into time domain data values. The TOA logic then calculates the time of arrive (TOA) of the original electromagnetic signal based, at least in part, on the time domain data values.

The system can include a controller, an input buffer and a memory. The controller is configured to control the symbol removal logic, the covariance logic, the correction logic and the TOA logic. The controller can also cause the FFT signal to be read from the input buffer and transferred to the symbol removal logic. Additionally, the controller can cause predetermined signal values to be read from the memory and transferred to the covariance logic. The covariance logic can then calculate the covariance of the perturbed data values with respect to the predetermined signal values.

Portions of the system or all of the system can be implemented on a semiconductor chip, in software or a combination of hardware and software. The system can operate in a signal to noise (SNR) environment of about 10 db.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
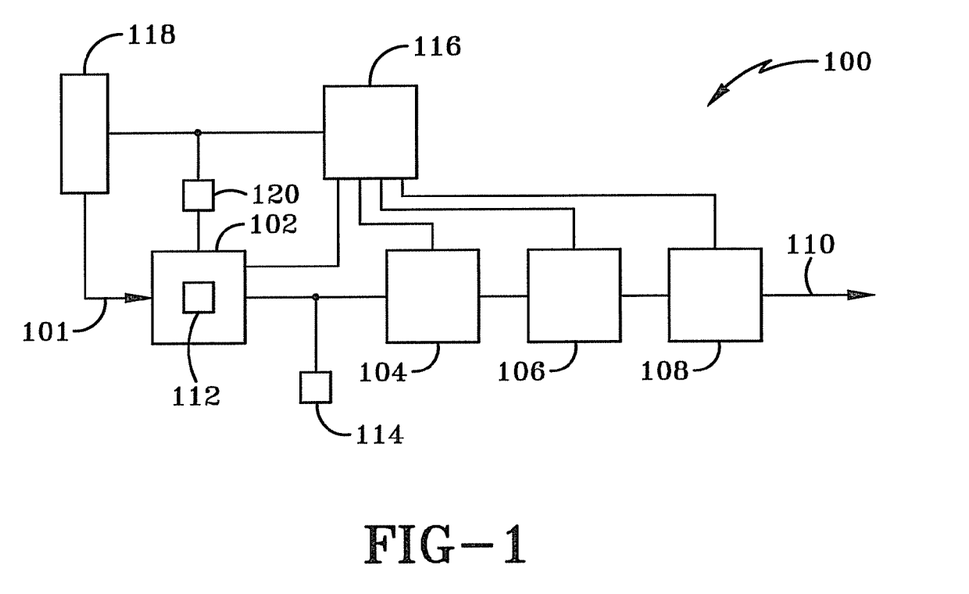
FIG. 1 illustrates a configuration of the preferred embodiment of a system that determines a time of arrival (TOA) of an electromagnetic signal.

FIG. 1 illustrates one configuration of a preferred embodiment that is system 100 for calculating the TOA of an electromagnetic signal. The system includes symbol removal logic 102, covariance logic 104, correction logic 106 and TOA logic 108. The symbol removal logic 102 receives fast Fourier transform (FFT) signal data at an input line 101 that is a FFT of an original electromagnetic signal containing symbol data. The symbol removal logic 102 removes the symbol data to generate perturbed data values of a new signal that has perturbed covariance. The covariance logic 104 calculates a covariance of the perturbed data values. The correction logic 106, at least partially, corrects the perturbed covariance to produce a corrected covariance. The TOA logic 108 calculates the TOA of the original electromagnetic signal based, at least in part, on the corrected covariance and the perturbed data values. The TOA is output on output line 110 and can be used to calculate a distance that can be used to locate a transmitter that transmitted the original electromagnetic signal.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

The system of 100 can include other device and be configured to perform other operations as understood by those of ordinary skill in the art. For example, the symbol removal logic 102 can include a multiplier 112 to multiply the FFT data by values to remove the symbol data. The system can include an inverse FFT (IFFT) logic 114 to convert the perturbed data values into time domain values. The system 100 can also include a controller 116 to control the other logic of the system as well as the data path of the system. The system can include one or more input buffers 118 and one or more memories 120. The input buffer can buffer input data such as FFT data values and the memory can store an ideal replica of FFT data values of the received electromagnetic signal that a recently received signal is to be correlated with.

The details and mathematics implemented by the method 100 will now be presented. In radio communications there is a delay in propagation between transmitter and receiver nodes in a network. This delay is directly proportional to the distance traveled by the radio wave, including reflections, if any. In many scenarios there is a dominant direct path (line of sight) whose length is proportional to the straight-line range between nodes. By identifying and measuring this path, in particular the TOA of the signal component it carries, a useful estimate of the range may be obtained.

The accurate estimation of TOA is complicated by several factors that are present in a communications scenario. First, the available signal is data-dependent (encoded with user information). In general, this obscures the waveform structure that is to be exploited in measuring TOA and so the data dependency must be stripped before range estimation is possible. Second, the operating environment generally includes multiple reflectors and scattering media resulting in a received signal that is characterized by multi-path. Third, range (TOA) accuracy depends on the bandwidth of the underlying signal, which may be limited. This limitation is particularly important in the use of linear processing techniques since then the available precision and resolution is nominally equal to the reciprocal of the signal bandwidth. Since it is desirable to estimate the leading edge of the signal multi-path bundle, it is imperative that the respective "rays" be resolvable. For this reason it becomes necessary to utilize non-linear techniques, such as subspace methods MUSIC, root-MUSIC, and ESPRIT.

In the following, a method that is capable of providing accurate TOA estimates under the above conditions is described. As a basis for the algorithm, we have chosen the MUSIC algorithm in order to illustrate the system application. Other subspace methods and derivatives thereof are also possible.

We begin with a description of the process when the underlying signal is OFDM. This choice is motivated by the natural way in which the demodulated OFDM signal contains the desired TOA information. Although this information is latent in the demodulated signal, it is relatively straight-forward to uncover it using a decision-directed procedure.

Having established the OFDM based approach, the technique is shown to be applicable to arbitrary waveforms. This is accomplished by certain transformations of the signals. In particular, the recovered user data, which must be stripped, is subjected to a transformation that permits the stripping process. One issue that arises in connection with the stripping process is noise enhancement and several methods are considered to mitigate that effect.

OFDM as a Prototype

We assume the basic operations of OFDM communication are familiar or may be obtained from the available literature and references. Thus, the description to follow will start with the receiver FFT processing.

An OFDM signal at the output of the receiver FFT operation is a noisy vector $$\underline{r} = D_H \underline{x} + \underline{n} \qquad \text{Equation 1}$$

where $D_H$ is a diagonal matrix of tone gains corresponding to the channel frequency response at the tone frequency, $[D_H]_{kk} = H(kf_0)$, x is a vector of information symbols (taken from a discrete alphabet) and $\underline{n}$ is an i.i.d. complex Gaussian noise vector.

Equation 1 may be written in the equivalent form $$\underline{r} = D_x \underline{h} + \underline{n} \qquad \text{Equation 2}$$

in which the $k^{th}$ component of h is $H(kf_0)$ and $D_x$ is the diagonal information symbol matrix. Note that if the information symbols are known (perhaps by locally decoding the OFDM signal), they may be stripped by simply multiplying the vector $\underline{r} = D_x \underline{h} + \underline{n}$ by $D_x^{-1}$ or $D^*_x$. These operations are different in general and have distinct effects on the noise, as will be elaborated upon in the following. Letting $E_x$ denote either $D_x^{-1}$ or $D_x^*$ according to the stripping approach chosen (designated as mode 1 or mode 2, respectively), we shall refer to the vector $\hat{\underline{r}} = E_x \underline{r}$ as the decision-processed OFDM signal vector.

The multi-path channel frequency response is given by (complex baseband representation)

$$H(f) = \sum_{n=0}^{N} \alpha_n e^{-j2\pi(f_c+f)\tau_n} \qquad \text{Equation 3}$$

where $\alpha_n$ is the $n^{th}$ ray gain (complex) and $\tau_n$ is the $n^{th}$ ray delay. Evidently, the effect of the carrier phase shift, $f_c \tau_n$, may be absorbed into the arbitrary ray gain's phase without loss of generality. Thus we may write $$H(f) = \sum_{n=0}^{N} \beta_n e^{-j2\pi f \tau_n} \qquad \text{Equation 4}$$

From this we see that the values of $[D_H]_{kk} = H(kf_0)$ are $$H(kf_0) = \sum_{n=0}^{N} \beta_n e^{-j2\pi kf_0 \tau_n} \qquad \text{Equation 5}$$

Equation 5 shows that $H(kf_0)$ comprises the samples of a weighted sum of cissoids. This is precisely the signal structure that is often analyzed using subspace methods, such as MUSIC.

Indeed, a signal comprising a sum of tones $$s(t) = \sum_{n=0}^{N} b_n e^{j2\pi f_n t} \qquad \text{Equation 6}$$

has samples $$s(kT_0) = \sum_{n=0}^{N} b_n e^{j2\pi k v_n T_0} \qquad \text{Equation 7}$$

which are identical to those of the decision-processed OFDM signal vector once the unknowns are written in the generic notation $$\theta_n = \begin{cases} f_0 \tau_n \\ T_0 v_n \end{cases} \qquad \text{Equation 8}$$

Define the K-dimensional sample vectors $$\underline{v}_n = \begin{bmatrix} 1 \\ e^{j\theta_n} \\ e^{j2\theta_n} \\ \vdots \\ e^{j(K-1)\theta_n} \end{bmatrix} \qquad \text{Equation 9}$$

and corresponding K×N matrix $$V = [\underline{v}_1 \vdots \underline{v}_2 \vdots \cdots \vdots \underline{v}_N] \qquad \text{Equation 10}$$

Then the observation may be written $$\underline{r} = D_x V \underline{\beta} + \underline{n} \qquad \text{Equation 11}$$

The noisy decision-processed vector is defined by $$\hat{r} = E_x D_x V \underline{\beta} + E_x \underline{n}$$
$$= \Gamma_x V \underline{\beta} + \underline{\mu}$$

Equation 12

The covariance of $\hat{r}$ is given in terms of the covariance of the channel gains and of the noise by (the overbar indicates mean value)

$$M_{\hat{r}} = \overline{\Gamma_x V M_\beta V^* \Gamma^*_x} + \sigma_n^2 M_{\underline{\mu}}$$

Equation 13

We shall assume that the channel gains are independent so that $M_\beta$ is diagonal. If $E_x = D_x^{-1}$ then $\Gamma_x$ is also the identify (and has no effect on the signal covariance). In this case (mode 1)

$$M_{\underline{\mu}} = E\{|x|^{-2}\}I$$
$$= \kappa_1 I$$

Equation 14 and $$M_{\hat{r}} = V M_\beta V^* + \kappa_1 I$$

Equation 15

On the other hand, if $E_x = D_x^*$ (mode 2), then $\Gamma_x$ is a positive diagonal matrix with entries $|x_k|^2$. In this case we note that the diagonal elements of $V M_\beta V^*$ are all equal to the trace of $M_\beta$. Assuming the information symbols to be i.i.d. random variables, $M_{\underline{\mu}}$ is simply $\sigma_x^2 I$, and we may then compute $M_{\hat{r}}$ as $$M_{\hat{r}} = \sigma_x^4 V M_\beta V^* +$$
$$[(E\{|x|^4\} - \sigma_x^4)\text{trace}(M_\beta) + \sigma_n^2 \sigma_x^2] I$$
$$= \sigma_x^4 V M_\beta V^* + \kappa_n I$$

Equation 16

Thus we see that in either case the minimizing eigenvectors of $M_{\hat{r}}$ correspond to null vectors of V, as desired for MUSIC. Note, however, that unless we have $E\{|x|^4\} = \sigma_x^4$ in the second case (mode 2), the effect of the information modulation is to produce a term proportional to the identity in the covariance $M_{\hat{r}}$. This is similar to the noise term and introduces a noise equivalent "floor" in the processing. This must be compared with the first case, in which the information symbols are divided out and the noise is amplified, or "enhanced", by the variance $E\{|x|^{-2}\} = \kappa_1$.

To determine the angles $\theta_n = f_0 \tau_n$ we proceed as follows. Given the set of minimizing eigenvectors, $\{\underline{\rho}_m\}$, each of which is in the null space of V, form the vector $$\underline{y}(e^{j\theta}) = \begin{bmatrix} 1 \\ e^{j\theta} \\ e^{j2\theta} \\ \vdots \\ e^{j(K-1)\theta} \end{bmatrix}$$

Equation 17 and the quadratic function $$\phi(e^{j\theta}) = \sum_{m=1}^{M} |\underline{y}^*(e^{j\theta}) \underline{\rho}_m|^2$$

Equation 18

This function is a non-negative trigonometric polynomial $w(e^{j\theta})$ that may be factored as $$w(z) = g(z)g(1/z^*)$$

Equation 19

The zeros of $g(z)$ lying on the unit circle determine the angles $\theta_n$ and thus the delays $\tau_n$.

Generalization to Non-OFDM Signal Structure

Let a signal $s(t;\underline{d})$ be defined by a certain modulation rule and data vector $(\underline{d})$. The K-sample vector obtained from an observation of $s(t;\underline{d})$ over T seconds is denoted by $$\underline{s}(\underline{d}) = \begin{bmatrix} s(0;\underline{d}) \\ s(T_s;\underline{d}) \\ s(2T_s;\underline{d}) \\ \vdots \\ s((K-1)T_s;\underline{d}) \end{bmatrix}$$

Equation 20

The observation time T is chosen so as to include a "guard" time, as will be explained subsequently. We project the vector $\underline{s}$ onto the subspace spanned by the M cissoids $$\underline{\psi}_m = \begin{bmatrix} 1 \\ e^{jm\Omega} \\ e^{j2m\Omega} \\ \vdots \\ e^{jKm\Omega} \end{bmatrix}, m = 0 \to M$$

Equation 21 where $\Omega$ is the radian frequency spacing.

Each of these is assumed to be a column from a DFT matrix with a cyclic prefix added. To perform the projection for a given modulation it is helpful to write the information bearing signal in terms of a basis $\{p_i(t)\}$ as follows $$s(t;\underline{d}) = \sum_{i=0}^{L} d_i p_i(t)$$

Equation 22 so that the sampled signal vector is given by $$\underline{s} = \sum_{i=0}^{L} d_i \underline{p}_i$$
$$= P\underline{d}$$

Equation 23

Now let the basis sample vectors $\underline{p}_i$ be expressed in terms of the cissoids:

$$\underline{p}_i = \sum_{m=0}^{M} c_{mi} \underline{\psi}_m + \underline{\varepsilon}$$

Equation 24 or, compactly $$P = \Psi C + E$$

Equation 25

The transmitted signal is then expressed as $$\underline{s} = \Psi C \underline{d} + E \underline{d}$$

$$= \Psi \hat{\underline{d}} + E \underline{d}$$

Equation 26

If the functions $p_i(t)$ are suitably windowed and zero-padded the projection error E may be made negligible. In any case the receiver may apply the projection to the received signal and null the error component. Then the signal has the exact structure of an OFDM waveform as described in the preceding discussion except that the data symbols are now transformed by the matrix C.

Having transformed the problem into the OFDM case the next step is to analyze the performance. It is noted that the pseudo-OFDM signal that we have created will not in general have the same uniform distribution of energy across the tones as true OFDM.

The Projection Operation

The projection of a vector, u, onto the space spanned by a set of vectors (the columns of $\Psi$) is given by $$\hat{\underline{u}} = \Psi \underline{c}$$

Equation 27 with $\underline{c}$ chosen so that $$\Psi^*(\underline{u} - \hat{\underline{u}}) = 0$$

$$\Psi^* \underline{u} - \Psi^* \Psi \underline{c} = 0$$

Equation 28 whence $$\underline{c} = (\Psi^* \Psi)^{-1} \Psi^* \underline{u}$$

Equation 29

$$\hat{\underline{u}} = \Psi (\Psi^* \Psi)^{-1} \Psi^* \underline{u}$$

Equation 30

Let $\Phi$ be an IDFT matrix and let $\Phi_1$ be its last L rows. Then $$\Psi = \begin{bmatrix} \Phi_1 \\ \Phi \end{bmatrix}$$

$$= \begin{bmatrix} J \\ I \end{bmatrix} \Phi$$

Equation 31 where $$J = [0 \; I_1]$$

Equation 32 and $I_1$ is the L×L identity matrix. It is noted that $$\begin{bmatrix} J \\ I \end{bmatrix}^* \begin{bmatrix} J \\ I \end{bmatrix} = I + J^* J$$

Equation 33 and substitute in Equation 30 to get $$\Psi(\Psi^*\Psi)^{-1}\Psi^* = \begin{bmatrix} J \\ I \end{bmatrix} \Phi(\Phi^*(I+J^*J)\Phi)^{-1}\Phi^*[J^* \; I]$$

$$= \begin{bmatrix} J \\ I \end{bmatrix} (I+J^*J)^{-1}[J^* \; I]$$

Equation 34 and $$\underline{c} = \Phi^* K \underline{u}$$

Equation 35 with $$K = (I + J^*J)^{-1}[J^* \; I]$$

$$= \begin{bmatrix} 2I_1 & 0 \\ 0 & I \end{bmatrix}^{-1} \begin{bmatrix} 0 & I & 0 \\ I_1 & 0 & I_1 \end{bmatrix}$$

$$= \frac{1}{2} \begin{bmatrix} 0 & 2I & 0 \\ I_1 & 0 & I_1 \end{bmatrix}$$

Equation 36

Note that $\Phi^*$ is a DFT matrix. We finally get for the matrix C of Equation 25

$$C = \Phi^* K U$$

Equation 37

Analysis

The only difference between the non-OFDM case and the previously described OFDM case is that the information symbols are now given by $$\underline{x} = C \underline{d}$$

Equation 38

This affects the statistics of the vector x. If the division approach (mode 1) is taken (the first case discussed in the OFDM context) then the effect is to create a noise covariance that is diagonal but with generally unequal variances. In that case Equation 15 becomes $$M_{\hat{r}} = V M_\beta V^* + \sigma_n^2 K$$

Equation 39

This may be modified (since K is known, as it depends on C, which is known) by forming $$\hat{M} = K^{-\frac{1}{2}} M_{\hat{r}} K^{-\frac{1}{2}}$$

$$= K^{-\frac{1}{2}} V M_\beta V^* K^{-\frac{1}{2}} + \sigma_n^2 I$$

Equation 40

The minimizing eigenvectors of this modified matrix determine the vectors that are in the null space of V. In fact, if $\underline{\xi}$ is such a minimizing vector, then $$\underline{\rho} = K^{-1/2} \underline{\xi}$$

Equation 41 is a null vector of V. Thus, a family $\{\underline{\rho}_m\}$ of null vectors may be found and the quadratic function $$\phi(e^{j\theta}) = \sum_{m=1}^{M} |\underline{v}^*(e^{j\theta}) \underline{\rho}_m|^2$$

may be formed as in the OFDM case.

In the alternative approach (mode 2), in which the information symbols are not divided but are instead multiplied by their conjugates, an analysis similar to that leading to Equation 16 is required. This is described next. As in Equation 12 we have $$\hat{\underline{r}} = E_x D_x V \underline{\beta} + E_x \underline{n}$$

$$= \Gamma_x V \underline{\beta} + \underline{\mu}$$

Equation 42 where $E_x = D_x^*$

Thus, taking expectations with respect to the noise and signal amplitudes first, followed by expectation with respect to the information symbols, we obtain $$M_{\hat{r}} = \overline{|D_x|^2} V M_\beta V^* \overline{|D_x|^2} + \sigma_n^2 \overline{|D_x|^2}$$

Equation 43

The matrix $\overline{|D_x|^2} = P_x$ is diagonal. Introduce the matrix $$Q_x = E\left\{\begin{bmatrix} |x_1|^2 \\ |x_2|^2 \\ |x_3|^2 \\ \vdots \\ |x_L|^2 \end{bmatrix} \begin{bmatrix} |x_1|^2 & |x_2|^2 & |x_3|^2 & \cdots & |x_L|^2 \end{bmatrix}\right\} \quad \text{Equation 44}$$

Then we may rewrite Equation 43 as $$M_{\underline{r}} = Q_x \cdot V M_{\underline{\beta}} V^* + \sigma_n^2 P_x \quad \text{Equation 45}$$

where A·B denotes the Schur, or Hadamard, product of matrices A and B. The matrix $P_x$ given by $$P_x = \sigma_d^2 C C^* \quad \text{Equation 46}$$

The matrix $Q_x$ requires a bit more work to evaluate, but it is clearly a function of the matrix C. One approach to determining $Q_x$ is to apply the Central Limit Theorem and regard the variables x to be Gaussian. In this case the statistics are completely determined by the matrix C. In any case $Q_x$ may be obtained empirically by Monte Carlo methods to any desired accuracy since the matrix C is known. Moreover, in applications of the present theory and method, the matrix $Q_x$ will not need to be computed but rather may be pre-computed and stored. As will be seen below, only certain related data is needed in the application of the method.
Continuing, we now express $Q_x$ as $$Q_x = D_Q + \sum_{j=1}^{J} \underline{q}_j \underline{q}_j^* \quad \text{Equation 47}$$

In Equation 47 the intention is to express $Q_x$ as a diagonal matrix plus a sum of a small number of rank 1 matrices. Note that if the transformation $$\underline{x} = C\underline{d} \quad \text{Equation 48}$$

was unitary and the central limit theorem is applied $Q_x$ would be the sum of a diagonal matrix and a single outer product, $Q_x = D_Q + \underline{q}\underline{q}^*$. We allow for correlations by providing the additional correction terms $\underline{q}_j\underline{q}_j^*$. In practice the matrix $Q_x$ is found to be well approximated by $Q_x = D_Q + \underline{q}\underline{q}^*$, that is, the $\underline{x}$ behave as though they are approximately uncorrelated. Our method permits any correlations that do exist to be accounted for. It should also be noted that an exact decomposition of the matrix $Q_x$ is not always needed for the purpose of determining the TOA of the dominant path. This is because the minimizing eigenvectors determined below (Equation 53) tend to be orthogonal to the first (dominant) column of V.

Associate with each vector $\underline{q}_j$ a diagonal matrix $D_j$ whose diagonal entries are the components of $\underline{q}_j$. Then Equation 45 becomes $$M_{\underline{r}} = \sum_{j=1}^{J} D_j V M_{\underline{\beta}} V D_j + D_Q \circ V M_{\underline{\beta}} V^* + \sigma_n^2 P_x \quad \text{Equation 49}$$

$$= \sum_{j=1}^{J} D_j V M_{\underline{\beta}} V D_j + D_Q \text{trace}(M_{\underline{\beta}}) + \sigma_n^2 P_x$$

$$= \sum_{j=1}^{J} D_j V M_{\underline{\beta}} V D_j + \kappa D_Q + \sigma_n^2 P_x$$

Now we note that if the rank of V is M then the rank of $$\sum_{j=1}^{J} D_j V M_{\underline{\beta}} V D_j$$

is at most JM. We also assume, as in ordinary MUSIC, that the demodulated signal sample vector, $\underline{\hat{r}}$, has dimension greater than JM.

After the matrix $M_{\underline{r}}$ is obtained (estimated) the final transformation is to convert the diagonal terms in Equation 49 to multiples of the identity. To this end recall that the matrices $D_Q$ and $Q_x$ are known but the parameters $\kappa$ and $\sigma_n^2$ are generally unknown. However, using the diagonal components of Equation 45 we obtain L equations in the 2 unknowns $\kappa$ and $\sigma_n^2$ may be easily solved.
Thus the matrix $$F = \kappa D_Q + \sigma_n^2 P_x \quad \text{Equation 50}$$

may be computed and factored easily as $$F = F^{1/2} F^{1/2} \quad \text{Equation 51}$$

so that we can write $$G_{\underline{r}} = F^{-1/2} M_{\underline{r}} F^{-1/2} \quad \text{Equation 52}$$

$$= F^{-1/2} \sum_{j=1}^{J} D_j V M_{\underline{\beta}} V D_j F^{-1/2} + I$$

in which the first term has rank at most JM.

Thus, the eigenvectors, $\underline{\xi}$, of $G_{\underline{r}}$, corresponding to the minimum eigenvalue, unity, give the null vectors of the matrix $$F^{-1/2} \sum_{j=1}^{J} D_j V M_{\underline{\beta}} V D_j F^{-1/2}.$$

In turn, each such eigenvector determines a vector $$\underline{\rho}_{mj} = F^{-1/2} D_j \underline{\xi}_m \quad \text{Equation 53}$$

lying in the null space of V. Using these vectors we may finally form the quadratic function $$\phi(e^{j\theta}) = \sum_{j=1}^{J} \sum_{m=1}^{M} |\underline{v}^*(e^{j\theta}) \underline{\rho}_{mj}|^2 \quad \text{Equation 54}$$

whose nulls determine the angles corresponding to the delayed signal components, and thus the range.

SIMULATION EXAMPLES

QAM with Bandlimited Pulses

In this subsection the algorithm described is applied to a QAM signal. In order to lower bound the performance that may be obtained without simulating all variations of the algorithm we have implemented the simplest approach to data stripping, mode 1, which is to divide out the information values as in Equation 12 and Equation 42. In general this division operation results in a noise enhancement effect that enters the algorithm before smoothing (averaging) is applied to estimate the covariance. The somewhat more complicated calculations required to apply data stripping by conjugate multiplication, as in Equations 42-54, have the advantage of a better behaved scaling of the noise prior to smoothing at the expense of perturbing the signal covariance. This perturbation is accounted for and compensated according to Equations 42-52, after the smoothing operation. Accordingly, it is to be expected that the algorithm sensitivity to noise will be less if the alternate data stripping approach is taken. The present discussion is intended to illustrate the algorithm and show that it can deliver reasonable accuracy (on the order of 1 nS) at signal-to-noise ratios available during short to medium range communications, approximately 15-25 dB. We note that extremely high accuracy ranging (less than one foot rms error) becomes most operationally meaningful in such scenarios. Still, we expect that the algorithm, once fully optimized, will be able to operate at the SNR's typical for communication, say 10 dB. The steps required to optimize the algorithm will be understood by one of ordinary skill in the art of signal processing of communication signals.

Suppose now that we consider a QAM signal given by $$s(t; \underline{d}) = \sum_{i=0}^{L} d_i p(t - iT_0)$$

Figure 2:
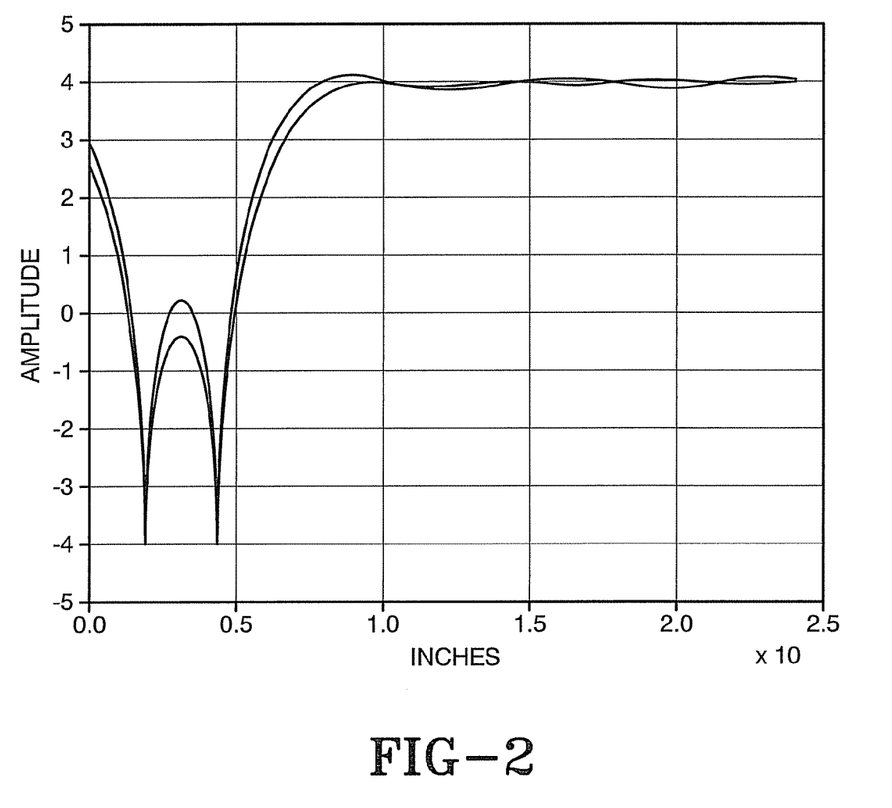
FIG. 2 illustrates a graph showing detection of channel structure for Non-OFDM signal 2 Rays, where the x axis is in inches, the y axis is the log amplitude of spectral function as represented in equation 54.
Figure 3:
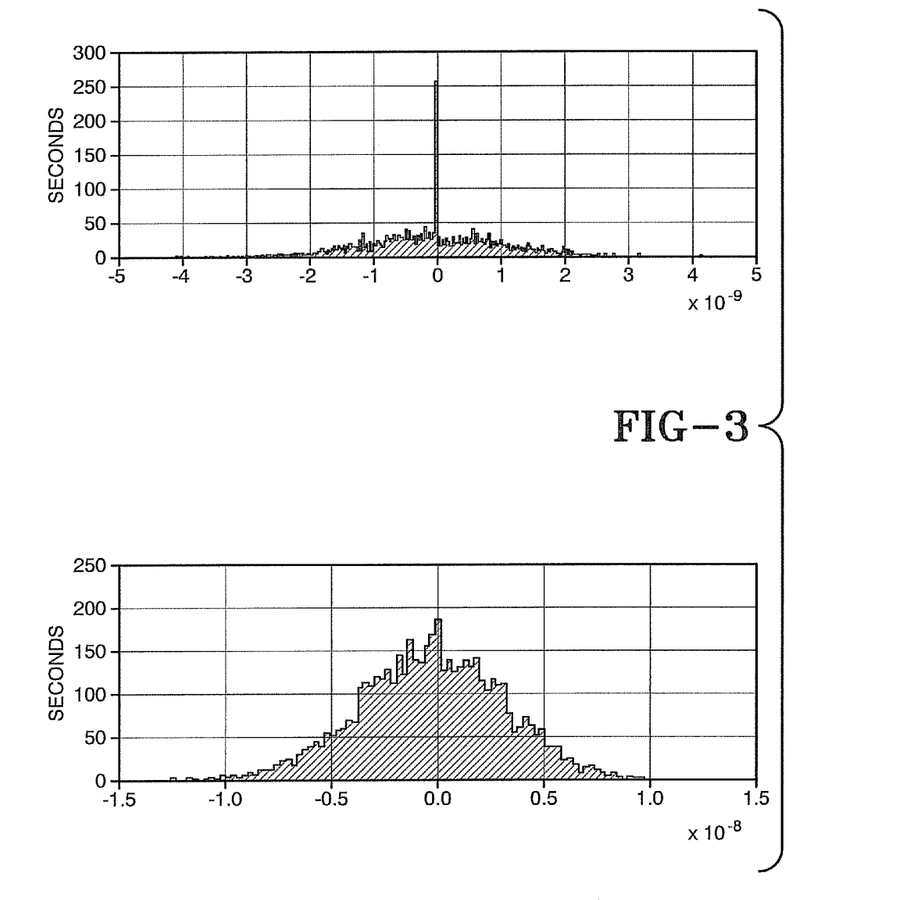
FIG. 3 illustrates a series of histograms of detection error of first ray (direct path) TOA in seconds.

Assuming a two ray multi-path model with Rayleigh fading on each path we can simulate and plot the spectral function vs. range in inches as shown in FIG. 2. The nulls in the figure occur at the ray delay values. The simulation parameters include Eb/No=25 dB, PSK modulation, with 10K symbols processed. A close examination of the spectral function gives the delay error histograms shown in FIG. 3. At SNR=15 dB we obtain an rms error of 3.3 nS. An increase to 25 dB reduces this to 0.95 nS, which is less than one foot. Again, we may regard this as a first cut estimate of available performance from a non-optimized algorithm.

This simulation demonstrates the general feasibility of applying MUSIC based techniques to the detection of TOA for non-OFDM signals.

Those skilled in the art will appreciate that the present invention offers a means of providing range information in a communication environment without reliance on special equipment or signals. Such functionality has many benefits, especially in critical mission applications such as military and emergency service. The main advantage provided by the invention is that the additional ranging functionality may be obtained as an appliqué without disrupting or modifying existing equipment or services. In addition, as a software function, it may be added to already developed systems at minimal cost. Since the function provided does not interfere with any other functions there is no operational disadvantage in practicing the invention.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
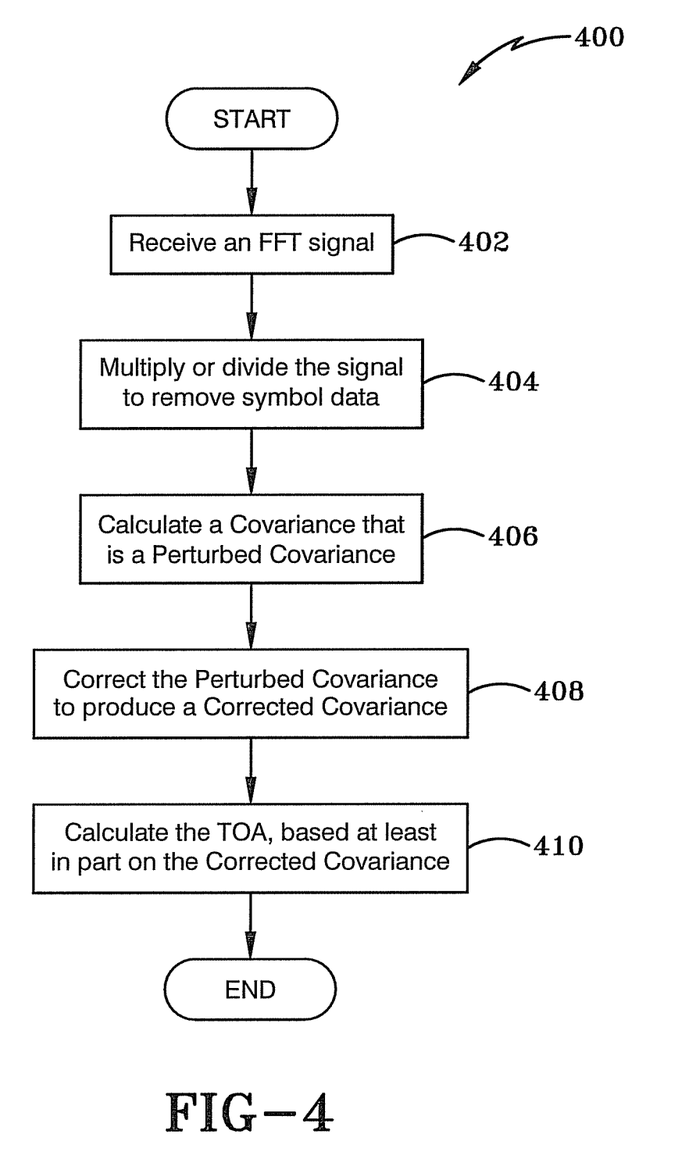
FIG. 4 illustrates a preferred embodiment of a method for determining the TOA of an electromagnetic signal.

FIG. 4 illustrates a method 400 for calculating a time of arrival (TOA) of an electromagnetic signal. The method 400 receives a fast Fourier transform (FFT) signal, at 402, that is an FFT of an original electromagnetic signal containing symbol data. The FFT signal is either multiplied or divided with a value, at 404, to remove the symbol data. Removing the symbol data generates a perturbed signal that is comprised of a perturbed data values with a perturbed covariance. The method 400 calculates a perturbed covariance of the perturbed data values, at 406. After the perturbed covariance is calculated, the method 400 at least partially corrects the perturbed covariance to produce a corrected covariance, at 408. The TOA of the original electromagnetic signal is calculated, at 410, based, at least in part, on the covariance and the corrected data values.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method comprising:
    receiving a fast Fourier transform (FFT) signal that is an FFT of an original electromagnetic signal containing symbol data;
    multiplying or dividing the FFT signal with a value to remove the symbol data to generate perturbed data values representing a perturbed signal with a perturbed covariance;
    calculating a perturbed covariance of the perturbed data values;
    after calculating the perturbed covariance, at least partially correcting the perturbed covariance to produce a corrected covariance; and
    calculating a time of arrive (TOA) of the original electromagnetic signal based, at least in part, on the corrected covariance.

2. The method of claim 1 further comprising:
    calculating a distance based, at least in part, on the corrected covariance; and
    locating a transmitting source of the original electromagnetic signal based, at least in part, on the distance.

3. The method of claim 1 wherein the calculating a perturbed covariance further comprises:
    applying a smoothing function to the corrected data values to generate an approximation of the perturbed covariance; and
    wherein at least partially correcting the perturbed covariance further comprises at least partially correcting the approximation of the perturbed covariance to produce a corrected approximation of the covariance; and wherein the calculating the TOA of the original electromagnetic signal based, at least in part, on the corrected approximation of the covariance.

4. The method of claim 1 further comprising:
performing an inverse FFT (IFFT) on the perturbed data values to produce time domain data values, wherein the calculating the TOA of the original electromagnetic signal is based, at least in part, on the time domain data values.

5. The method of claim 1 wherein the correcting the perturbed covariance is performed in the time domain.

6. The method of claim 1 further comprising:
reading a reference signal data out of a memory; and
wherein the calculating the perturbed covariance is based, at least in part, on the reference signal data.

7. The method of claim 1 where at least a portion of the method is performed by at least one subspace method of the group of: estimation of signal parameters via rotational invariant techniques (ESPRIT), multiple signal classification (MUSIC) and root-MUSIC.

8. The method of claim 1 wherein the calculating the TOA further comprises:
calculating peak values of the corrected covariance, and wherein the TOA is calculated based, at least in part, on the peak values.

9. The method of claim 1 further comprising:
determining whether the FFT signal needs to be multiplied by complex conjugate values to remove the symbol data and using complex conjugate values to remove the symbol data when the FFT signal needs to be multiplied by complex conjugate values to remove the symbol data.

10. The method of claim 9 wherein the at least partially correcting the covariance further comprise:
at least partially correcting the perturbed covariance with a first method when the FFT signal does not to be multiplied by complex conjugate values to remove the symbol data; and
at least partially correcting the perturbed covariance with a second method that is different than the first method when the FFT signal needs to be multiplied by complex conjugate values to remove the symbol data.

11. The method of claim 1 wherein at least a portion of the method of claim 1 is performed with software.

12. A method for solving for a time of arrival (TOA) of an electromagnetic signal regardless of how the electromagnetic signal is modulated comprising:
defining an output of a receiver a noisy vector $$\underline{r} = D_H \underline{x} + \underline{n},$$

where $D_H$ is a diagonal matrix of tone gains corresponding to a channel frequency response at a tone frequency of $[D_H]_{kk} = H(kf_0)$, x is a vector of information symbols and n is an i.i.d. complex Gaussian noise vector, where r may be written in the equivalent form $$\underline{r} = D_x \underline{h} + \underline{n}$$

where the $k^{th}$ component of h is $H(kf_0)$ and $D_x$ is the diagonal information symbol matrix, where information symbols can be stripped by simply multiplying the vector $r = D_x h + n$ by $D_x^{-1}$ or $D_x^*$;
letting $E_x$ denote either $D_x^{-1}$ or $D_x^*$ where $E_x$ represents the values used to strip symbols from $r = D_x h + n$, wherein the received stripped signal is represented by:

$$\underline{\tilde{r}} = E_x \underline{r}$$

where the multi-path channel frequency response is given by complex baseband representation:

$$H(f) = \sum_{n=0}^{N} \alpha_n e^{-j2\pi(f_c+f)\tau_n},$$

where $\alpha_n$ is the $n^{th}$ ray complex gain and $\tau_n$ is the $n^{th}$ ray delay, wherein the effect of the carrier phase shift, $f_c \tau_n$, may be absorbed into the arbitrary ray gain's phase without loss of generality, wherein $$H(f) = \sum_{n=0}^{N} \beta_n e^{-j2\pi f \tau_n},$$

where the values of $[D_H]_{kk} = H(kf_0)$ are $$H(kf_0) = \sum_{n=0}^{N} \beta_n e^{-j2\pi k f_0 \tau_n},$$

where $H(kf_0)$ comprises the samples of a weighted sum of cissoids;
where a signal comprises a sum of tones:

$$s(t) = \sum_{n=0}^{N} b_n e^{j2\pi f_n t},$$

with samples $$s(kT_0) = \sum_{n=0}^{N} b_n e^{j2\pi k v_n T_0},$$

wherein $$\theta_n = \begin{cases} f_0 \tau_n \\ T_0 v_n, \end{cases}$$

wherein K-dimensional sample vectors are defined as:

$$\underline{v}_n = \begin{bmatrix} 1 \\ e^{j\theta_n} \\ e^{j2\theta_n} \\ \vdots \\ e^{j(K-1)\theta_n} \end{bmatrix},$$

wherein a corresponding K×N matrix is defined as:

$$V = [\underline{v}_1 \vdots \underline{v}_2 \vdots \cdots \vdots \underline{v}_N],$$

where $$\underline{r} = D_x V \underline{\beta} + \underline{n},$$

wherein a noisy decision-processed vector is defined by:

$$\hat{\underline{r}} = E_x D_x V \underline{\beta} + E_x \underline{n}$$
$$= \Gamma_x V \underline{\beta} + \underline{\mu};$$

defining a projection of a vector, u, onto the space spanned by a set of vectors as:

$$\underline{\hat{u}} = \Psi \underline{c},$$

where u, are the columns of the matrix $\Psi$ with $\underline{c}$ chosen so that $$\Psi^*(\underline{u}-\underline{\hat{u}})=0$$

$$\Psi^*\underline{u}-\Psi^*\Psi\underline{c}=0,$$

where $$\underline{c}=(\Psi^*\Psi)^{-1}\Psi^*\underline{u}$$

$$\underline{\hat{u}}=\Psi(\Psi^*\Psi)^{-1}\Psi^*\underline{u};$$

letting $\phi$ be an IDFT matrix and letting $\phi_1$ be its last L row, then $$\Psi = \begin{bmatrix} \Phi_1 \\ \Phi \end{bmatrix}$$
$$= \begin{bmatrix} J \\ I \end{bmatrix} \Phi,$$

where
J=[0 $I_1$],
and $I_1$ is the L×L identity matrix where $$\begin{bmatrix} J \\ I \end{bmatrix}^* \begin{bmatrix} J \\ I \end{bmatrix} = I + J^*J,$$

where $$\Psi(\Psi^*\Psi)^{-1}\Psi^* = \begin{bmatrix} J \\ I \end{bmatrix} \Phi(\Phi^*(I+J^*J)\Phi)^{-1}\Phi^*[J^* \ I]$$
$$= \begin{bmatrix} J \\ I \end{bmatrix}(I+J^*J)^{-1}[J^* \ I],$$

and where
$\underline{c}=\Phi^*K\underline{u},$
where $$K = (I+J^*J)^{-1}[J^* \ I]$$
$$= \begin{bmatrix} 2I_1 & 0 \\ 0 & I \end{bmatrix}^{-1} \begin{bmatrix} 0 & I & 0 \\ I_1 & 0 & I_1 \end{bmatrix}$$
$$= \frac{1}{2} \begin{bmatrix} 0 & 2I & 0 \\ I_1 & 0 & I_1 \end{bmatrix},$$

where is a discrete Fourier transform (DFT) matrix and where $$C = \Phi^*KU;$$

defining:

$$\underline{x}=C\underline{d},$$

where $\underline{d}$ represents symbol data of a received electromagnetic signal, wherein when the symbol data is removed without multiplying with a complex conjugate the covariance is represented by:

$$M_{\hat{r}} = VM_\beta V^* + \sigma_n^2 K,$$

wherein because K is known, as it depends on C:

$$\hat{M} = K^{-\frac{1}{2}} M_{\hat{r}} K^{-\frac{1}{2}}$$
$$= K^{-\frac{1}{2}} V M_\beta V^* K^{-\frac{1}{2}} + \sigma_n^2 I,$$

wherein the minimizing eigenvectors of $M_\beta$ determine the vectors that are in the null space of V, wherein when $\underline{\xi}$ is a minimizing vector:

$$\underline{\rho}=K^{-1/2}\underline{\xi};$$

finding a family $\{\underline{\rho}_m\}$ of null vectors, wherein the quadratic function is formed as:

$$\phi(e^{j\theta}) = \sum_{m=1}^{M} |\underline{y}^*(e^{j\theta})\underline{\rho}_m|^2;$$

wherein when symbols data can be removed by multiplication with conjugates:

$$\hat{\underline{r}} = E_x D_x V \underline{\beta} + E_x \underline{n}$$
$$= \Gamma_x V \underline{\beta} + \underline{\mu},$$

where:
$E_x = D_x^*,$
where:

$$M_{\hat{r}} = \overline{|D_x|^2} V M_\beta V^* \overline{|D_x|^2} + \sigma_n^2 \overline{|D_x|^2},$$

wherein matrix $\overline{|D_x|^2}=P_x$ is diagonal;
defining:

$$Q_x = E \left\{ \begin{bmatrix} |x_1|^2 \\ |x_2|^2 \\ |x_3|^2 \\ \vdots \\ |x_L|^2 \end{bmatrix} [|x_1|^2 \ |x_2|^2 \ |x_3|^2 \ \ldots \ |x_L|^2] \right\},$$

where:

$$M_{\hat{r}} = Q_x \cdot V M_\beta V^* + \sigma_n^2 P_x,$$

wherein A·B denotes the Schur, or Hadamard, product of matrices A and B, and wherein the matrix $P_x$ is given by:

$$P_x = \sigma_d^2 CC^*,$$

wherein matrix $Q_x$ is a function of matrix C and can be expressed as:

$$Q_x = D_Q + \sum_{j=1}^{J} \underline{q}_j \underline{q}_j^*,$$

wherein $Q_x$ is expressed as a diagonal matrix plus a sum of a small number of rank 1 matrices, wherein when x=Cd is unitary, $Q_x$ is the sum of a diagonal matrix and a single outer product, with $Q_x = D_Q + \underline{qq}^*$;

providing for correlation by providing the additional correction terms $\underline{q}_j\underline{q}_j^*$, wherein is approximated by $Q_x = D_Q + \underline{qq}^*$, wherein the x values behave as though the x values are approximately uncorrelated so that correlations that do exist are accounted for;

associating with each vector $\underline{q}_j$ a diagonal matrix $D_j$ whose diagonal entries are the components of $\underline{q}_j$, wherein:

$$M_{\tilde{r}} = \sum_{j=1}^{J} D_j VM_\beta VD_j + D_Q \cdot VM_\beta V^* + \sigma_n^2 P_x$$

$$= \sum_{j=1}^{J} D_j VM_\beta VD_j + D_Q \text{ trace}(M_\beta) + \sigma_n^2 P_x$$

$$= \sum_{j=1}^{J} D_j VM_\beta VD_j + \kappa D_Q + \sigma_n^2 P_x,$$

wherein when the rank of V is M, then the rank of $$\sum_{j=1}^{J} D_j VM_\beta VD_j$$

is at most JM;

obtaining L equations with unknowns $\kappa$ and $\sigma_n^2$ using the diagonal components of $M_{\tilde{r}=Qx} \cdot VM_\beta V^* + \sigma_n^2 P_x$ and solving for $\kappa$ and $\sigma_n^2$, wherein matrix:

$$F = \kappa D_Q + \sigma_n^2 P_x$$

can be computed and factored as:

$$F = F^{1/2} F^{1/2},$$

wherein $$G_{\tilde{r}} = F^{-\frac{1}{2}} M_{\tilde{r}} F^{-\frac{1}{2}}$$

$$= F^{-\frac{1}{2}} \sum_{j=1}^{J} D_j VM_\beta VD_j F^{-\frac{1}{2}} + I,$$

wherein the first term has a rank at most of JM, wherein the eigenvectors, $\underline{\xi}$, of $G_{\tilde{r}}$, corresponding to the minimum eigenvalue, unity, give the null vectors of the matrix $$F^{-\frac{1}{2}} \sum_{j=1}^{J} D_j VM_\beta VD_j F^{-\frac{1}{2}},$$

wherein each eigenvector, $\underline{\xi}$, determines a vector:

$$\underline{\rho}_{mj} = F^{-1/2} D_j \underline{\xi}_m$$

lying in the null space of V;

using these vectors $\underline{\rho}_{mj} = F^{-1/2} D_j \underline{\xi}_m$, forming a quadratic function:

$$\phi(e^{j\theta}) = \sum_{j=1}^{J} \sum_{m=1}^{M} |\underline{v}^*(e^{j\theta})\underline{\rho}_{mj}|^2,$$

the nulls of the quadratic function determine angles corresponding to the delayed signal components; and determining a TOA based, at least in part, on the angles corresponding to the delayed signal components.

* * * * *